US007655709B2

(12) United States Patent
Huang et al.

(10) Patent No.: US 7,655,709 B2
(45) Date of Patent: Feb. 2, 2010

(54) AQUEOUS SELF-ADHESIVE COATING FOR ELECTRICAL STEEL AND ITS USES

(75) Inventors: Changguo Huang, Shanghai (CN); Feng Yu, Shanghai (CN); Xiao Chen, Shanghai (CN); Zhigang Yu, Shanghai (CN); Zhuolei Chen, Shanghai (CN); Meiping Zou, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 31 days.

(21) Appl. No.: 11/587,733

(22) PCT Filed: Apr. 27, 2005

(86) PCT No.: PCT/CN2005/000578

§ 371 (c)(1),
(2), (4) Date: Oct. 27, 2006

(87) PCT Pub. No.: WO2005/105937

PCT Pub. Date: Nov. 10, 2005

(65) Prior Publication Data

US 2007/0231463 A1  Oct. 4, 2007

(30) Foreign Application Priority Data

Apr. 28, 2004  (CN)  ........................ 2004 1 0017997

(51) Int. Cl.
*C08L 63/00* (2006.01)
*C08G 59/18* (2006.01)
*C08G 59/68* (2006.01)
*B05D 7/14* (2006.01)
*B05D 5/10* (2006.01)

(52) U.S. Cl. ........................ 523/420; 523/402; 523/404; 523/415; 528/93; 106/287.22; 427/58; 427/104

(58) Field of Classification Search ................ 524/612; 427/58, 104; 106/287.22, 287.3; 523/402, 523/404, 415, 420; 528/93
See application file for complete search history.

(56) References Cited

U.S. PATENT DOCUMENTS

| 3,793,073 | A | * | 2/1974 | Kitayama et al. | ............ 428/141 |
| 4,410,596 | A | * | 10/1983 | Whiteside et al. | ............ 428/413 |
| 4,611,036 | A | * | 9/1986 | Sekiguchi et al. | ............ 525/481 |
| 5,008,308 | A | * | 4/1991 | Takahashi et al. | ............ 523/406 |
| 5,500,461 | A | * | 3/1996 | Young | ........................ 523/404 |
| 5,500,462 | A | * | 3/1996 | Young | ........................ 523/404 |
| 5,945,212 | A | * | 8/1999 | Tanaka et al. | ................ 428/327 |
| 6,503,967 | B1 | * | 1/2003 | Kitajima et al. | ............. 523/421 |
| 6,949,592 | B2 | * | 9/2005 | Lienert et al. | ................ 523/402 |
| 2001/0043134 | A1 | * | 11/2001 | Decristofaro et al. | ........ 335/302 |
| 2005/0189067 | A1 | * | 9/2005 | Wimmer et al. | ............. 156/330 |

FOREIGN PATENT DOCUMENTS

| CN | 1491245 | | 4/2004 |
| JP | 11162723 | A * | 6/1999 |
| JP | 2000290538 | | 10/2000 |
| JP | 2000290626 | | 10/2000 |
| WO | WO 02066534 | A1 * | 8/2002 |

* cited by examiner

*Primary Examiner*—Mark Eashoo
*Assistant Examiner*—Michael Pepitone
(74) *Attorney, Agent, or Firm*—Hamre, Schumann, Mueller & Larson, P.C.

(57) ABSTRACT

A self-adhesive coating for electrical steel and its uses is described. The coating includes 81-99.9 weight parts of aqueous epoxy resin emulsion, 0.07-17 weight parts of curing agent, and optionally 0.3 weight parts of accelerant. The coating optionally contains additives selected from diluent, filler, toughener, colorant, fire retardant, antirusting agent, antisettling agent, thixotropic agent or antifoamer, thickener, pigment dispersant, preservative, and the like. The coating can be used as electrical steel coating. The coating is capable of making electrical steel with a self-adhesive coating by naked-flame heat, and also there are no poisonous organic solvents to volatilize during the entire process. The coating can avoid use of an apparatus for burning organic solvents, which reduced cost.

8 Claims, No Drawings

AQUEOUS SELF-ADHESIVE COATING FOR ELECTRICAL STEEL AND ITS USES

CROSS-REFERENCE TO RELATED APPLICATION

This Application is a Section 371 National Stage Application of International Application No. PCT/CN2005/000578, filed 27 Apr. 2005 and published as WO 2005/105937 A1 on 10 Nov. 2005, the subject matter of which are hereby incorporated by reference in its entirety.

FIELD OF INVENTION

This invention relates to a coating for electrical steel and use thereof, in particular, to an aqueous self-adhesive coating for electrical steel and a use thereof.

BACKGROUND

Most sheets of electrical steel are assembled into a product by welding or rivetting. However, welding fixation may result in a short circuit of edge portion of iron core, thus insulating property decreases. Further, various problems occur due to thermo-deformation, such as degradation of magnetic characteristics. In addition, when welding, burning of coating film generates harmful gases, and cohesion force is also poor. The welding and rivetting methods are not suitable to many mini electric machines thereby. In this case, it is an attractive fixation method to bond sheets of electrical steel to form an iron core. If an adhesive is applied onto each sheet of electrical steel cut off, production efficiency is very low, and the bonding is difficult to control and hardly homogeneous. Thus, to apply an adhesive directly onto surface of steel sheet in roll to form a self-bonding coat will increase subsequent process efficiency greatly.

The electrical steel plate thus obtained can be stored in sheet or roll form for a long time before being used to make an iron core. During storage, the steel plate does not rust, and no problem occurs such as the coating film breaks up. Thereafter, upon heating and pressing the coated surface at any time as desired, an iron core with excellent properties such as high bond strength between layers may be obtained.

Thyssen Krupp Steel EBG Company (Germany) has developed a steel plate with a self-bonding coat, which has multiple properties simultaneously, such as insulating property, corrosion resistance, improved punching property, and property of bonding with each other. When such steel sheets are assembled into an iron core product, they need no welding or rivetting any more, and avoid generation of harmful gases on welding. Further cohesion force between sheets is high enough. The product thus obtained may be used as a long stator iron core of Maglev.

However, the self-bonding coating used by EBG Company is a solvent-based product. A large amount of solvent vaporizes during the baking of the coating. In order to eliminate pollution to the surrounding, an incinerator is needed to burn out the solvent. Furthermore, any naked-flame baking device is not suitable for this product.

An aqueous heat-adhesive coat composition is proposed by Kawasaki (JP 6-21274). It comprises an emulsion of thermoplastic synthesis resin, an emulsion of epoxy resin, a curing agent and a film-forming agent. The composition may be applied onto the surface of steel sheet, and form a self-bonding coat.

Since the composition is formed by mixing an emulsion of thermoplastic resin and an emulsion of epoxy resin, which are not compatible completely with each other, the coat resulted thereby is not homogeneous, not transparent, and has a poor peel strength and shear strength. Further, in order to form a continuous coat without any crack, it is necessary to add a large amount of film-forming agent. This results in significant reduction of peel strength and adhesion strength of the coat. Furthermore, the liquid coating must be formulated in situ before application. It has a short shelf-life and is inconvenient for application.

SUMMARY OF INVENTION

An object of the present invention is to provide an aqueous self-adhesive coating for electrical steel, which is free of solvent. It can be used to produce electrical steel with a self-bonding coat, and can be heated in a naked-flame during manufacture of the coat of electrical steel.

Another object of the present invention is to provide a use of said aqueous self-adhesive coating.

The aqueous self-adhesive coating for electrical steel of the present invention comprises an aqueous emulsion of epoxy resin and a curing agent.

The amount of aqueous emulsion of epoxy resin used in the present invention is 81 parts to 99.9 parts by weight, preferably 81 to 95 parts by weight, more preferably 81 to 90 parts by weight. If the amount exceeds 99.9 parts by weight, the coat would be cured insufficiently due to relative low amount of curing agent in the coating composition. If the amount is less than 81 parts by weight, the coat would be over-cured due to high amount of curing agent in the coating composition. In each case, a poor peel strength is resulted in. The solid level of the aqueous emulsion of epoxy resin is 10% to 80% by weight, based on the weight of the emulsion, preferably 30% to 70% by weight, more preferably 40% to 60% by weight.

Epoxy resin is a low molecular weight compound in form of liquid or solid at room temperature with two (or more) active epoxy groups contained in a molecular. Epoxy resin may be obtained via reaction of polyhydric alcohols, polyatomic phenols and halo-alcohols. The type of epoxy resin may be selected from the group consisting of bisphenol A type, halo-bisphenol A type, phenolic aldehyde type, polyethylene glycol bisphenol A type, oil epoxide, etc. All epoxy resins mentioned above with an epoxy equivalent of 93 to 5500 can be used in the present invention. The epoxy equivalent is preferably 200 to 4000. These epoxy resins may be used alone or in combination. In order to prevent blocking caused by the coating in conduit, epoxy resin in solid form at room temperature is preferably used, and the epoxy equivalent is more preferably 500 to 3000.

Representative examples of epoxy resin suitable for the present invention are listed as follows: epoxy resins of bisphenol A diglycidyl ether type (from Shell Chemical Company, a joint-venture company of UK and Holland, such as Epikote #828, #1001, #1002, #1004, #1007, etc., molecular weight increasing as increase of the model number); aliphatic epoxy resins (from Dow Chemical Company of America, such as D.E.R.511-A80 and 732, with an epoxy equivalent of 310 to 330); epoxy resins (from Tohtokasei of Japan, such as YD-011, 001, 001Z, 012, 014; ST-5080, 5100; and YDCN-701, 702, 703, 704, YDPN-638, etc.). In addition, rubber-modified epoxy resins may also be used, such as EPI-REZ3519 (from Resolution Company, America). Such epoxy resin can improve toughness of the coat, and thereby increase cohesion strength of the coat.

The method for preparing the aqueous emulsion of epoxy resin of the present invention comprises the following steps: crushing epoxy resin by a mill, such as Raymond mill, air stream mill, or hammer swing mill; forming an emulsion in the presence of emulsifier by a normal forced-emulsification manner. In addition, besides emulsifiers, non-ionic surfactants and auxiliary emulsifiers may be used as well. Representative examples of non-ionic surfactants are polyoxyethylene alkylphenol ethers, and examples of auxiliary emulsifiers are polyoxyethylene, polyoxypropylene, block polyether or an addition product thereof with diisocyanate compounds. These compounds may be used alone or in combination.

A product of aqueous emulsion of epoxy resin may also be used directly in the present invention, such as Emulsion GEM03 (epoxy resin emulsion of bisphenol A type, available from Lujia Aqueous Coating Co. Shanghai, China), Emulsion ACUATORT 5003 (phenolic resin type, from Tohtokasei, Japan), Emulsion EPI-REZ3540 (Resolution Company, America), etc. Of course, a synthesized aqueous emulsion of epoxy resin may also be used in the present invention. Examples of the synthesized aqueous emulsion of epoxy resin are aqueous emulsions of epoxy resin formed by polymerizing polyhydric alcohol, polyatomic phenol and haloalcohol in water.

Adhesion of the coat to substrate and antirust property of the coat are improved due to the use of epoxy resin emulsion.

In the aqueous emulsion of epoxy resin of the present invention, the amount of curing agent is 0.07 to 17 parts by weight, preferably 0.1 to 10 parts by weight, more preferably 0.5 to 5 parts by weight. If the amount is less than 0.07 parts by weight, peel strength of the resultant coat is poor due to a large amount of uncured epoxy resin remaining in the system. If the amount is greater than 17 parts by weight, the rate of cure reaction is too high, and the coat on surface of steel sheet will be over-cured. Similarly, it results in a significant decrease of peel strength of the coat.

Curing agent of the present invention is one or more selected from the group consisting of dicyandiamides, boron trifluoride complex, imidazole derivatives, organic hydrazides, diamido maleic nitrile and derivatives thereof, or tripolycyanamide and derivatives thereof. Representative examples are dicyandiamide, adipic acid dihydrazide, amide ethyl piperazine, piperidine hetero cyclic amide (e.g. EPOMET, from Ajnomoto, Japan), cyclohexamethylenetetramine, triaminoethane, triethanolamine, 4,4'-methylene-o-triethylenediamine, isopyrazoles, imidazoline derivatives, Bronstic acid salt cp66 and cp77 (from Adeka Group, Japan), etc. Dicyandiamide is preferable.

After curing agent and epoxy resin emulsion are mixed, the coating obtained is applied onto the surface of steel sheet, and a coat is formed thereby. Thereafter, even if the resulted coat is placed aside at room temperature for a long period of time, such as a year, reaction between curing agent and epoxy resin does not take place. Upon exposure to heat, light, moisture, etc., cure reaction takes place immediately. The cure reaction is preferably initiated by exposure to heat. When heated at a temperature of 100 to 300° C. and a pressure applied, cure reaction between epoxy resin and curing agent occurs.

The aqueous self-adhesive coating for electrical steel comprises optionally an accelerator in an amount of 0 to 3 parts by weight, preferably 0 to 2 parts by weight, more preferably 0 to 1 parts by weight. The use of accelerator may further improve peel strength of the coat, etc. If the amount of accelerator is greater than 3 parts by weight, the rate of cure reaction is too fast, resulting in an overcure of the coat on the surface of steel sheet. Peel strength of the coat also decreases significantly.

The accelerators useful in the present invention are urea derivatives, imidazole derivatives, and organic guanidine derivatives. They may be used alone or in combination. A representative example of urea derivatives is N-para-chlorophenyl N', N'-dimethyl urea. Examples of imidazole derivatives are 2-methyl imidazole (2-MI), 2-ethyl imidazole, 2-phenyl imidazole, 2-undecyl imidazole, 2-heptadecyl imidazole, etc. Examples of organic guanidine derivatives are tetra-methyl guanidine, acyl-substituted guanidine, or alkyl-substituted guanidine.

The coating composition of the present invention may further comprise optionally diluent, filler, toughener, colorant, fire retardant, antirust agent, anti-settling agent, thixotropic agent or defoamer, tackifier, colorant dispersant, preservative, and other various additives as needed.

An example of diluents used in the present invention is ethanediol monoethylether, etc. An example of fillers is such as silicon micro powder. An example of tougheners is polypropanediol diglycidylether. An example of colorants is titania or carbon black. An example of fire-retardants is aluminum hydroxide. An example of antirusts is aqueous emulsified antirust (Nopcochex RD, available from Coming Company, Germany). An example of anti-settling agents is organic bentonite. An example of thixotropic agents is gaseous silica. An example of defoamers is Nopco 8034 defoamer (available from Coming Company, Germany). An example of tackifiers is an aqueous tackifier (SO-Thick 30, available from Trichemical Industrial Corporation, Taiwan, China). An example of colorant dispersants is Dispers 715w (available from DegusaCompany, Germany). An example of preservatives is a bactericidal preservative (CANGUARD 327, available from Angus Chemical Company, USA). These additives are used in amounts conventional in the art.

The method for preparing the aqueous self-adhesive coating of the present invention comprises: mixing together the ingredients mentioned above, i.e. aqueous emulsion of epoxy resin, curing agent, accelerator and some optional auxiliary agent. The aqueous self-adhesive coating of the present invention can thus be obtained directly thereby.

The aqueous self-adhesive coating of the present invention is applied onto the surface of electric steel. After baking, cooling, followed by winding, an electrical steel sheet with a self-adhesive coat having excellent properties is obtained.

The aqueous self-adhesive coating of the present invention may be applied onto electrical steel, including non-oriented electrical steel and oriented electrical steel. It is used to manufacture electrical steel with a self-adhesive coat.

The aqueous self-adhesive coating of the present invention has unexpected effects compared with the prior coatings. Most prior electrical steel products with a self-adhesive coat known in the art are made from a solvent-based coating, while the coating of the present invention is free of any solvent, containing no harmful organic solvent. It is friendly and safe to environment. It also eliminates the use of additional device for burning organic solvent out, and the cost for manufacturing the coating is reduced. Said self-adhesive coating has a long shelf-life, and is convenient for application. In addition, the electrical steel with a self-adhesive coat made from the coating of the present invention has excellent properties. For example, the resultant coat is homogeneous and transparent, and has a high peel strength and shear strength. By comparison, the method for manufacturing electrical steel with an self-adhesive coat by using the prior aqueous self-adhesive coating of the Japanese patent mentioned above has such defects that the coat is unhomogeneous and opaque, and has poor peel strength and shear strength. Further, the coating of the Japanese patent must be formulated in situ just before application. It has a short shelf-life and is inconvenient for application. In addition, the present invention uses epoxy resin adhesive as a main component, but not the thermoplastic resin emulsion of the Japanese patent, thus a self-adhesive coat with good quality can be obtained. The resultant electrical steel with a self-adhesive coat has good properties and can solve the technical problem mentioned above completely.

The aqueous self-adhesive coating of the present invention can be used to produce electrical steel with a self-adhesive coat, and can be heated in naked-flame during manufacture of the coat of electrical steel. Further, during the whole process, there is no poison organic solvent to volatilize.

Test method

1. Preparation of samples to be tested

The aqueous self-adhesive coating of the present invention is applied onto the surface of electrical steel sheet by a roller to form a coat with a thickness of 1 micron to 20 microns.

2. T peel strength of the coat of electrical steel

After sample sheets with a self-adhesive coating are heat-pressed directly, T peel strength (I) is measured on a tensile machine, such as a "zwick z100" model electron tensile machine, according to Chinese National standard, GB/2791-1981. After sample sheets with a self-adhesive coating are aged, followed by being heated and pressed, T peel strength (II) is measured on a tensile machine, such as a "zwick z100" model electron tensilemachine, according to Chinese National standard, GB/2791-1981. T peel strength (II) characterizes adhesive property of the coat after storage for several months.

Said heat pressing step is described as follows.

(i) Cutting a electrical steel sheet with a self-adhesive coating having a thickness of 5 microns into three to five pairs of sample sheets with a size of 25 mm×120 mm;

(ii) Laminating a pair of sample sheets face to face, i.e. having their coated sides in contact with each other. All pairs of sample sheets, i.e. totally three to five pairs of sample sheets, are laminated in the same way.

A group of laminates is thus formed.

(iii) Placing the group of laminates on a press having a hot table, and heat-pressing them under a pressure of 0.8 to 3 Mpa, at a temperature of 160 to 250° C., for a time of from 30 to 300 min, followed by cooling to room temperature;

(iv) Removing multiple pairs of sample sheets bonded together, and testing T peel strength.

Said aging procedure is described as follows:

Heating electrical steel sheet with a self-adhesive coating having a thickness of 5 microns at a temperature of 60 to 120° C. for 48 to 96 hours, Removing and cooling.

3. Resistance to spray of salt aqueous solution of electrical steel coat

Coating electrical steel sheet with the coating of the present invention to a thickness of 5 micron by a roller, and baking at a temperature of 300° C. for 30 seconds, and cooling, Spraying a salt aqueous solution of 5% concentration onto the coat of electrical steel by a atomizer Observing the coat with naked eyes, if surface of the coat has no rust and corrosion, or area of rust and corrosion is less than 10%, it is evaluated as "good".

4. Appearance property of the coat of electrical steel

Coating electrical steel sheet with the coating of the present invention to a thickness of 5 microns by a roller, and baking at a temperature of 300° C. for 30 seconds, and cooling, Observing the coat with naked eyes, if surface of the coat has no impairments, blemishs, cracks, etc., the appearance of the coat is "good", otherwise is "poor".

EXAMPLE

Example 1

10 kg of solid epoxy resin of bisphenol A diglycidylether type (Epikote #1007, available from Shell Chemical Company, a joint-venture of UK and Holland) is crushed into particle having an average size of 20 microns by an air-stream mill or hammer swing mill, and is added into a reaction kettle. Said epoxy resin has an epoxy equivalent of 2000 (See Table 1). Then, 10 kg water and 200 grams of docosanol ethoxylate (tradename RHODASURF BEH-25, available from Rhodia Company, France) as a non-ionic emulsifier are added into the kettle. The mixed materials are stirred at a rate of 500 rpm or more to form an aqueous emulsion of epoxy resin. Solid level of the emulsion is 50 % by weight.

The obtained emulsion is mixed with dicyandiamide as a curing agent, and 2-methyl imidazole as an accelerator in amounts as shown in Table 2, resulting thus in an aqueous self-adhesive coating of the present invention.

The obtained coating is applied onto electrical steel by a roller. It is baked in an oven at a temperature of 150° C. for 100 seconds. A self-adhesive coat is thus formed with a thickness of 3 microns. Then, the resultant coat is tested as mentioned above, and the obtained properties of the coat are shown in Table 2.

The type of epoxy resin used in the present invention is listed in Table 1. The properties of the coat of Examples of the present invention and those of Comparison Examples are shown in Table 2.

Example 2

Emulsion of epoxy resin of phenolic aldehyde type (tradename ACUATORT 5003, available from Tohtokasei, Japan) is mixed with dicyandiamide as a curing agent, 2-methyl imidazole as an accelerator in amounts as shown in Table 2, and thus an aqueous self-adhesive coating is formed. Said emulsion has an epoxy equivalent of 205.

The obtained coating is applied onto electrical steel by a roller. It is baked in an oven at a temperature of 180° C. for 90 seconds. A self-adhesive coat is thus formed with a thickness of 5 microns. Then, the resultant coat is tested as mentioned above, and the obtained properties of the coat are shown in Table 2.

Example 3

Emulsion of epoxy resin of bisphenol A type (tradename GEM03, available from Lujia Aqueous Coating Co. Shanghai, China) is mixed with dicyandiamide as a curing agent, 2-methyl imidazole as an accelerator in amounts as shown in Table 2, and thus an aqueous self-adhesive coating is formed. Said emulsion has an epoxy equivalent of 450.

The obtained coating is applied onto electrical steel by a roller. It is baked in an oven at a temperature of 250° C. for 60 seconds. An self-adhesive coat is thus formed with a thickness of 9 micron. Then, the resultant coat is tested as mentioned above, and the obtained properties of the coat are shown in Table 2.

Example 4

10 kg of liquid epoxy resin of glycidyl amine type (tradename Tetra-GXDA, available from Mitsubishi Gas Chemical Co, Japan) is added into a reaction kettle. Said epoxy resin has an epoxy equivalent of 93 (See Table 1). Then, 23 kg water and 200 gram of docosanol ethoxylate (tradename RHODASURF BEH-25, available from Rhodia Company, France) as non-ionic emulsifier are added into the kettle. The mixed materials are stirred vigorously at a rate of 800 rpm or more to form an aqueous emulsion of epoxy resin. Solid level of the emulsion is 30% by weight.

The obtained emulsion is mixed with dicyandiamide as a curing agent in amounts as shown in Table 2, resulting in an aqueous self-adhesive coating of the present invention.

The obtained coating is applied onto electrical steel by a roller. It is baked in an oven at a temperature of 350° C. for 30 seconds. An self-adhesive coat is thus formed with a thickness of 6 micron thereby. Then, the resultant coat is tested as mentioned above, and the obtained properties of the coat are shown in Table 2.

Example 5

10 kg of epoxy resin of bisphenol A type (tradename EPONOL Resin 55-BH-30, available from Shell Chemical Company, joint-venture of UK and Dutch) is crushed into particles having an average size of 20 microns by an Raymond mill or an air-stream mill, and is added into a reaction kettle. Said epoxy resin has an epoxy equivalent of 5500 (See Table 1). Then, 4.3 kg water and 200 gram of docosanol ethoxylate (tradename RHODASURF BEH-25, available from Rhodia Company, France) as a non-ionic emulsifier are added into the kettle. The mixed materials are stirred vigorously at a rate of 800 rpm or more to form an aqueous emulsion of epoxy resin. Solid level of the emulsion is 70 % by weight.

The obtained emulsion is mixed with dicyandiamide as a curing agent, and 2-methyl imidazole as an accelerator in amounts as shown in Table 2, resulting in an aqueous self-adhesive coating of the present invention.

The obtained coating is applied onto electrical steel by a roller. It is baked in an oven at a temperature of 350° C. for 40 seconds. An self-adhesive coat is thus formed with a thickness of 15 micron thereby. Then, the resultant coat is tested as mentioned above, and the obtained properties of the coat are shown in Table 2.

TABLE 1

| Type of epoxy resin emulsion | Tradename | Producer | Epoxy equivalent |
|---|---|---|---|
| No. 1 bisphenol A | Epikote # 1007 | Shell Chemical Company | 2000 |
| No. 2 phenolic resin | ACUATORT 5003 | Tohtokasei | 205 |
| No. 3 bisphenol A | Emulsion GEM03 | Lujia Aqueous Coating Co. Shanghai | 450 |
| No. 4 glycidyl amine | Tetra-GXDA | Teerady-y (Mitsubishi Gas Chemical Co) | 93 |
| No. 5 bisphenol A | EPONOL Resin 55-BH-30 | Shell Chemical Company | 5500 |

TABLE 2

| | | Ingredients (parts by weight) | | | | | | | | |
|---|---|---|---|---|---|---|---|---|---|---|
| | | Type of epoxy resin | | | | | curing agent | | | Accelerator |
| | | | | | | | | adipic acid | | 2-methyl |
| | | No 1 | No 2 | No 3 | No 4 | No 5 | dicyandiamide | dihydrazide | EPOMET | imidazole |
| Examples | 1 | 97.32 | — | — | — | — | 0.11 | | | 2.57 |
| | 2 | 97.88 | — | — | — | — | 1.09 | | | 1.04 |
| | 3 | — | 97.43 | — | — | — | 2.52 | | | 0.05 |
| | 4 | — | 95.69 | — | — | — | 4.31 | | | |
| | 5 | 72.1 | — | 20.5 | — | — | 7.35 | | | 0.02 |
| | 6 | — | — | 85.88 | — | — | 14.1 | | | |
| | 7 | 99.9 | — | — | — | — | 0.1 | | | |
| | 8 | 96.93 | — | — | — | — | 0.07 | | | 3 |
| | 9 | — | 81 | — | — | — | 17 | | | 2 |
| | 10 | — | 97.4 | — | — | — | — | 2 | | |
| | 11 | 96 | — | — | — | — | — | | 3 | |
| | 12 | — | 95 | — | — | — | 5 | | | |
| | 13 | — | — | — | 86.2 | — | 13.8 | | | |
| | 14 | — | — | — | — | 93.5 | 6.5 | | | |
| Comparison Examples | 1 | — | — | 81.27 | — | — | 18.71 | | | 0.02 |
| | 2 | 99.74 | — | — | — | — | 0.05 | | | 0.21 |
| | 3 | — | 93.81 | — | — | — | 2.06 | | | 4.12 |
| | 4 | 70 | — | — | — | — | 25 | | | 5 |

| | | Ingredients (parts by weight) | Tested Property | | | |
|---|---|---|---|---|---|---|
| | | Accelerator 2-phenyl imidazole | Appearance of coat | Resistance to spray of salt aqueous solution | T peel strength(I) (N/mm) | T peel strength(II) (N/mm) |
| Examples | 1 | | good | good | 5.5 | 5.6 |
| | 2 | | good | good | 5.8 | 5.8 |
| | 3 | | good | good | 5.9 | 6.0 |
| | 4 | | good | good | 5.3 | 5.0 |
| | 5 | | good | good | 6.4 | 5.4 |
| | 6 | | good | good | 5.9 | 5.1 |

TABLE 2-continued

|  |  |  |  |  |  |  |
|---|---|---|---|---|---|---|
|  | 7 |  | good | good | 5.2 | 5.3 |
|  | 8 |  | good | good | 5.4 | 5.6 |
|  | 9 |  | good | good | 5.7 | 5.6 |
|  | 10 | 0.6 | good | good | 5.2 | 5.0 |
|  | 11 | 1 | good | good | 4.9 | 5.1 |
|  | 12 |  | good | good | 5.3 | 4.8 |
|  | 13 |  | good | good | 4.8 | 4.7 |
|  | 14 |  | good | good | 5.0 | 4.8 |
| Comparison | 1 |  | good | good | 1.1 | 1.3 |
| Examples | 2 |  | poor | good | — | — |
|  | 3 |  | good | good | 0.5 | 0.7 |
|  | 4 |  | good | good | 0.4 | 0.3 |

From Comparison Example 1, it is seen that the amount of dicyandiamide as a curing agent is greater than 17 parts by weight, i.e. 18.71 parts by weight, and T peel strengths obviously decrease, i.e. 1.1 and 1.3 respectively. In Comparison Example 2, the amount of dicyandiamide is less than 0.07 parts by weight, i.e. 0.05 parts by weight, and T peel strength is not measurable. In Comparison Example 3, the amount of accelerator is greater than 3 parts by weight, i.e. 4.12 parts by weight, and T peel strengths obviously decrease, i.e. 0.5 and 0.7 respectively. In Comparison Example 4, the amount of epoxy resin is less than 81 parts by weight, i.e. 70 parts by weight, T peel strengths are the worst, i.e. 0.4 and 0.3 respectively.

Table 3 shows a comparison of peel strength (N/mm) between two coats resulted from the coating of the present invention and that of the prior art. (The coats are formed under same conditions). Data in Table 3 indicate that property of the aqueous self-adhesive coat of the present invention is superior over that of the prior solvent-based self-adhesive coat.

TABLE 3

| Coat | Sample | | | | | |
|---|---|---|---|---|---|---|
|  | 1 | 2 | 3 | 4 | 5 | 6 |
| Peel strength of the aqueous coat of the present invention (N/mm) | 5.5 | 5.8 | 5.9 | 5.3 | 6.4 | 5.9 |
| Peel strength of the solvent-based coat (N/mm) | 3.9 | 4.8 | 4.0 | 4.8 | 4.2 | 5.0 |

Note:
Samples 1 to 6 of the coat in Table 3 correspond to the coating of Examples 1 to 6 in Table 2 respectively.

What is claimed is:

1. A method of preparing an aqueous self-adhesive coating on electrical steel and forming an iron core comprising:
    preparing an aqueous self-adhesive coating comprising an aqueous emulsion of epoxy resin of 81 to 99.9 parts by weight, a curing agent of not less than 0.07 and not more than 0.1 parts by weight, the aqueous self-adhesive coating is free of organic solvent,
    wherein said epoxy resin has an epoxy equivalent of 93 to 5500,
    wherein the curing agent is dicyandiamide;
    applying the aqueous self-adhesive coating onto a surface of an electrical steel sheet; and
    bonding multiple pairs of electrical steel sheets together and forming an iron core.

2. The method according to claim 1, wherein the aqueous self-adhesive coating further comprises an accelerator in an amount of 0 to 3 parts by weight.

3. The method according to claim 1, wherein the epoxy resin has an epoxy equivalent of 200 to 4000.

4. The method according to claim 1, wherein the epoxy resin has an epoxy equivalent of 500 to 3000.

5. The method according to claim 2, wherein the accelerator is one or more selected from the group consisting of urea derivatives, imidazole derivatives, and organic guanidine derivatives.

6. The method according to claim 5, wherein said urea derivative is N-para-chlorophenyl N',N'-dimethyl urea;
    said imidazole derivatives are 2-methyl imidazole, 2-ethyl imidazole, 2-phenyl imidazole, 2-undecyl imidazole, or 2-heptadecyl imidazole;
    said organic guanidine derivatives are tetra-methyl guanidine, acyl-substituted guanidine, or alkyl-substituted guanidine.

7. The method according to claim 1, further comprising performing an aging procedure by heating the electrical steel sheet with the coating applied on the electrical steel sheet at a temperature of 60° C. to 120° C. for 48 to 96 hours.

8. An aqueous self-adhesive coating comprising: an aqueous emulsion of epoxy resin of 81 to 99.9 parts by weight, a curing agent of not less than 0.07 and not more than 0.1 parts by weight, the aqueous self-adhesive coating is free of organic solvent, wherein said epoxy resin has an epoxy equivalent of 93 to 5500, wherein the curing agent is dicyandiamide.

* * * * *